(12) United States Patent
Luo et al.

(10) Patent No.: US 10,037,284 B2
(45) Date of Patent: Jul. 31, 2018

(54) BRIDGING AND INTEGRATING DEVICES ACROSS PROCESSING SYSTEMS

(71) Applicant: Intel Corporation, Santa Clara, CA (US)

(72) Inventors: Sai Luo, Beijing (CN); Xin Zhou, Beijing (CN); Chunxiao Lin, Beijing (CN); Yingzhe Shen, Beijing (CN); Li Shang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 13/977,010

(22) PCT Filed: Oct. 3, 2012

(86) PCT No.: PCT/CN2012/082517
§ 371 (c)(1),
(2) Date: Jun. 27, 2013

(87) PCT Pub. No.: WO2014/053071
PCT Pub. Date: Apr. 10, 2014

(65) Prior Publication Data
US 2014/0250253 A1 Sep. 4, 2014

(51) Int. Cl.
*G06F 12/10* (2016.01)
*G06F 13/40* (2006.01)
(Continued)

(52) U.S. Cl.
CPC .......... *G06F 12/1081* (2013.01); *G06F 13/32* (2013.01); *G06F 13/404* (2013.01);
(Continued)

(58) Field of Classification Search
None
See application file for complete search history.

(56) References Cited

U.S. PATENT DOCUMENTS 7,496,739 B1 * 2/2009 Raghavan ............. G06F 21/572
709/219
2002/0083254 A1 * 6/2002 Hummel ................. G06F 13/24
710/261

(Continued)

FOREIGN PATENT DOCUMENTS

CN 101394420 3/2009
WO WO 2014/053071 4/2014

OTHER PUBLICATIONS

International Search Report and Written Opinion received for PCT Patent Application No. PCT/CN2012/082517, dated Jun. 6, 2013, 10 pages.

(Continued)

*Primary Examiner* — Idriss N Alrobaye
*Assistant Examiner* — Dayton Lewis-Taylor
(74) *Attorney, Agent, or Firm* — Alliance IP, LLC

(57) ABSTRACT

Particular embodiments described herein can offer an electronic fabric for a processing system that includes a fabric adapter to couple to a first fabric associated with a first system and to couple to a second fabric associated with a second system. The fabric adapter is configured to pass bidirectional communications between the first system and the second system. The electronic fabric can further include an address translation agent configured to map a first physical address in a first address space of the first system to a second physical address in a second address space of the second system.

13 Claims, 5 Drawing Sheets

(51) Int. Cl.
*G06F 13/32* (2006.01)
*G06F 12/1081* (2016.01)

(52) U.S. Cl.
CPC .. *G06F 13/4022* (2013.01); *G06F 2213/0026* (2013.01); *Y02D 10/14* (2018.01); *Y02D 10/151* (2018.01)

(56) References Cited

U.S. PATENT DOCUMENTS

| | | |
|---|---|---|
| 2002/0144001 A1 | 10/2002 | Collins et al. |
| 2009/0248928 A1 | 10/2009 | Mandhani et al. |
| 2014/0189187 A1* | 7/2014 | Acharya ............... G06F 13/385 710/310 |

OTHER PUBLICATIONS

PCT International Preliminary Report on Patentability in PCT International Patent Application No. PCT/CN2012/082517, dated Apr. 7, 2015.
First Office action dated Aug. 28, 2016 in Chinese Application No. 201280075596.0 with English translation.
Second Office action dated Apr. 24, 2017 in Chinese Application No. 201280075596.0 with English translation.
SIPO, Third CN Office Action dated Jul. 25, 2017 in Chinese Application No. 201280075596.0 with English translation, 24 pages.

* cited by examiner

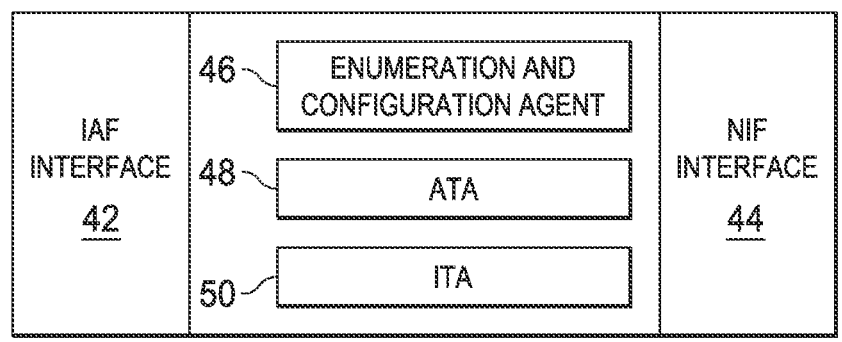
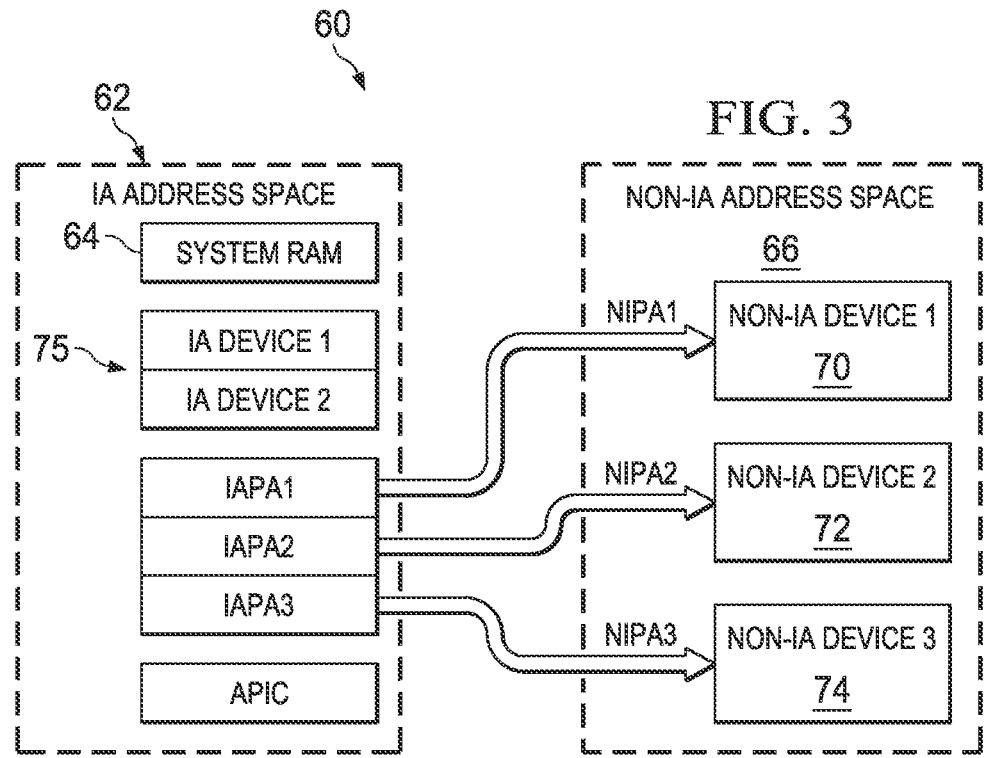

BRIDGING AND INTEGRATING DEVICES ACROSS PROCESSING SYSTEMS

TECHNICAL FIELD

Embodiments described herein generally relate to bridging and integrating devices across processing systems.

BACKGROUND

A system on a chip or system on chip (SoC or SOC) reflects an integrated circuit (IC) that incorporates components of a computer (or any other electronic system) into a single chip. The SoC may contain digital, analog, mixed-signal, and/or radio frequency functions: all of which may reside on a single chip substrate. A typical SoC application is in the area of embedded systems. SoC technology represents a large financial market. Additionally, corporations in this space can face significant challenges in designing high-diversity SoC chips within a short timeframe.

One obstacle associated with these designs relates to compatibility in certain architecture ecosystems (e.g., Intel Architecture (IA) ecosystems). By contrast, Non-IA ecosystems include a wealth of available devices, cores, fabrics, firmware, software (e.g., driver), tools etc. Due to their high-availability and richness, new SoC products can be quickly designed and manufactured to fulfill dynamic market needs. However, the IA ecosystem cannot match this level of richness. Hence, intelligent integration strategies should be deployed in order to seamlessly incorporate various types of Non-IA devices into various ecosystems.

BRIEF DESCRIPTION OF THE DRAWINGS

Embodiments are illustrated by way of example and not by way of limitation in the FIGURES of the accompanying drawings, in which like references indicate similar elements and in which:

FIG. 2 is a simplified block diagram illustrating one possible implementation of an intelligent fabric adapter architecture associated with the present disclosure;

FIG. 3 is a simplified block diagram illustrating one possible address mapping configuration in accordance with one example implementation associated with present disclosure;

Figure 1:
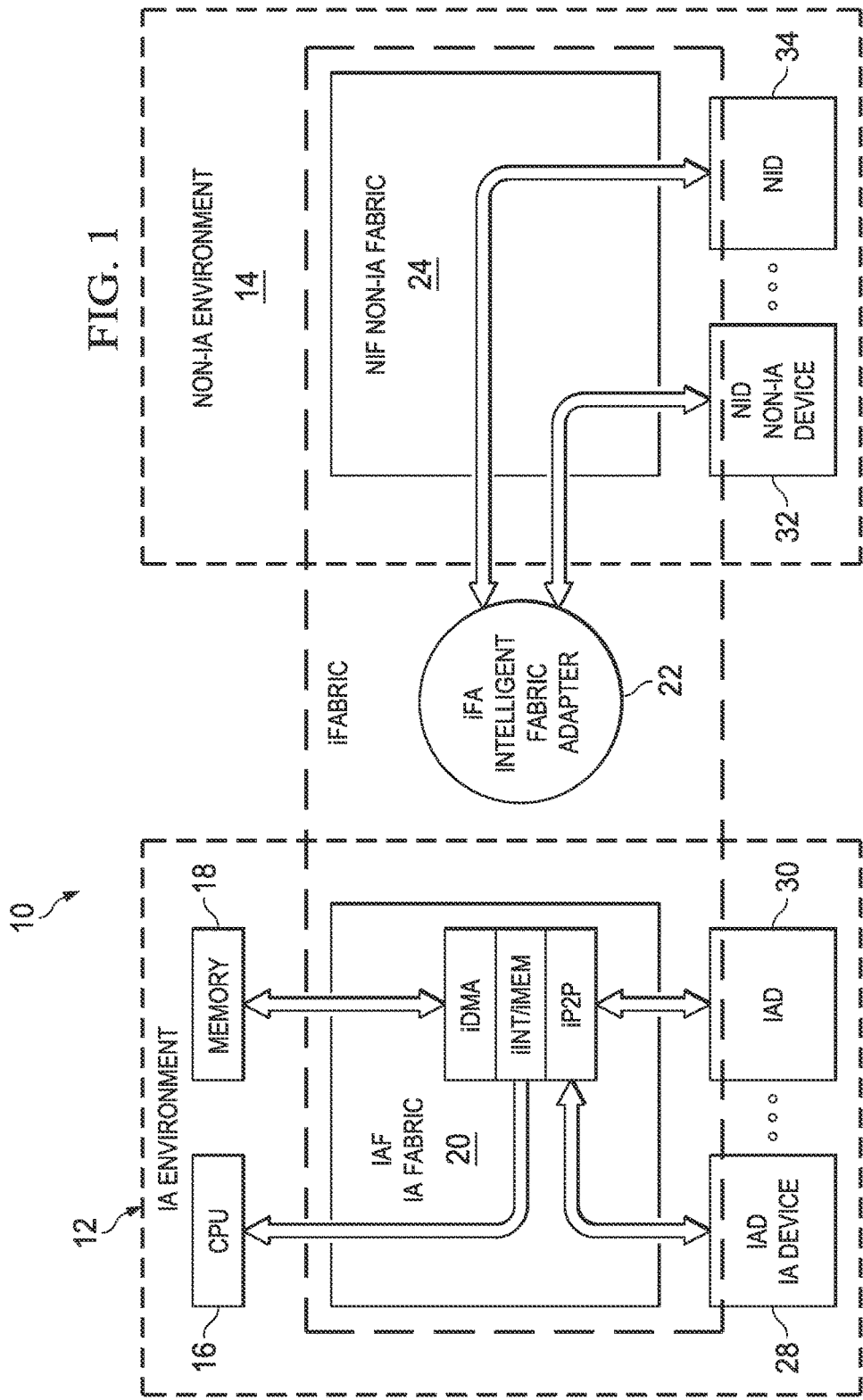
FIG. 1 is a simplified block diagram illustrating an example embodiment of an intelligent fabric system architecture associated with the present disclosure.

The FIGURES of the drawings are not necessarily drawn to scale or proportion, as their dimensions, arrangements, and specifications can be varied considerably without departing from the scope of the present disclosure.

DETAILED DESCRIPTION OF EXAMPLE EMBODIMENTS

The following detailed description sets forth example embodiments of apparatuses, methods, and systems relating to bridging and integrating devices across processing systems. Features such as structure(s), function(s), and/or characteristic(s), for example, are described with reference to one embodiment as a matter of convenience; various embodiments may be implemented with any suitable one or more of the described features.

Commonly, several techniques can be employed to reuse Intellectual Property (IP) devices in a different ecosystem. Different ecosystems can have a different central processing unit (CPU) core/memory/interrupt architecture, different fabric/bus architecture, and/or a different device enumeration model, etc. If the fabric has changed, the simplest way to address this integration issue is to replace the legacy bus interface of the IP devices with a new one. This effectively breaks the IP devices in such scenarios. As an alternative, some techniques add a thin wrapper layer to adapt the old interface to a new one. However, such methods focus on hardware reuse, where the software (e.g., driver) should be modified extensively due to the memory/interrupt architecture differences, etc. In addition, certain solutions could impose undesired silicon area sacrifices and costs. Another flawed approach uses a certain Non-IA fabric and, further, adds an adapter between the Non-IA fabric and IA fabric. The Non-IA devices would still connect to their original bus interface. However, such approaches fail to support bidirectional transactions, which are important when high-performance is required. More importantly, such solutions are restricted to hardware design considerations, leaving a software developer in a difficult situation for implementing and/or porting the drivers.

Particular embodiments described herein can offer an electronic fabric for a processing system that includes a fabric adapter to couple to a first fabric associated with a first system and to couple to a second fabric associated with a second system. The fabric adapter is configured to pass bidirectional communications (of any kind) between the first system and the second system. The electronic fabric can further include an address translation agent configured to map a first physical address in a first address space of the first system to a second physical address in a second address space of the second system.

Note that processing system could be a transistor, a processor, a microprocessor, an amplifier, a field-programmable gate array (FPGA), any other type of integrated circuit, etc. Additionally, the processing system can be part of any type of notebook computer, laptop computer, personal computer, mobile device, tablet computer/device (e.g., an i-Pad), a personal digital assistant (PDA), a smartphone, etc.

In more specific embodiments, the electronic fabric may include a configuration agent configured to communicate with a first interface associated with the first fabric and to communicate with a second interface associated with the second fabric. The configuration agent can be configured to support enumeration commands from a Peripheral Component Interconnect Express (PCIe) bus that are of a standard format. The enumeration commands can also be of a self-defined format. The configuration agent can be configured to return information to an operating system relating to one or more installed devices associated with the second system.

In yet other example implementations, the electronic fabric may include an interrupt translation agent configured to translate an interruption request originating from the second system to a format recognized by the first system. The configuration agent can be configured to accept a configuration command and to set one or more parameters for the address translation agent and the interrupt translation agent. One or more devices associated with the second system can be enumerated by interacting with the configuration agent. Corresponding drivers of the devices of the second system can be loaded after the address translation agent is configured. The address translation agent can be configured by writing to the configuration agent.

Numerous details associated with these capabilities, along with various other features and functions associated with the present disclosure are discussed below with reference to the accompanying FIGURES and descriptions.

Integrating Devices Across Diverse Processing Environments

FIG. 1 is a simplified block diagram illustrating a system 10 for providing an intelligent fabric (iFabric) architecture in accordance with one embodiment of the present disclosure. In one particular implementation, system 10 can be configured to bridge Non-IA devices to an IA system. System 10 may include an IA environment 12 and a Non-IA environment 14. IA environment 12 and Non-IA environment 14 can be viewed as separate arenas in which sharing Intellectual Property (IP) devices is challenging. This gap can be broken by the architecture of the present disclosure, for example, by using an Intelligent Fabric Adapter (iFA), along with some possible enhancements to the existing fabrics. In a typical IA environment, there exists a central processing unit (CPU), a memory, and IA Devices (IADs) connected by the IA Fabric (IAF). This environment can be extended by reusing Non-IA Device (NID) IP devices from the traditionally Non-IA environment, which can be connected by the Non-IA Fabric (NIF).

In the particular example of FIG. 1, IA environment 12 may include a CPU 16, a memory 18, an IAF IA fabric 20, an IAD IA device 28, and an IAD 30. In addition, Non-IA environment 14 may include a NIF Non-IA fabric 24, a NID Non-IA device 32, and a NID 34. In operation, the iFabric architecture attempts to reuse the hardware, firmware, software, and tools, etc. from a Non-IA ecosystem. For example, one type of Non-IA ecosystem is the ARM ecosystem, although it is imperative to note that the present disclosure applies equally to any other Non-IA system. As a result of the iFabric capabilities, the architecture can merge Non-IA IP devices to the IA system with no (or minimum) configuration changes to the hardware/firmware and, further, with no (or minimum) software changes to the driver. The Non-IA IP generation and integration tools can also be leveraged such that designers from Non-IA areas can continue their design efforts as if they are developing technology for a Non-IA system. This can be achieved by designing the actual fabric to strategically fill semantic gaps between two contrasting systems. In addition to the reusability features, the iFabric architecture can offer advanced feature units, as discussed below.

System 10 is configured to support cross-boundary direct memory access (DMA) transfers initiated from the Non-IA side. DMA allows certain hardware subsystems within the computer to access system memory independently of the CPU. Without DMA, when the CPU is using programmed input/output, it is typically fully occupied for the entire duration of the read or write operation, and is therefore unavailable to perform other work. With DMA, the CPU initiates the transfer, does other operations while the transfer is in progress, and receives an interrupt from the DMA controller when the operation is done.

The particular DMA capability for system 10 may be referred to as an intelligent DMA (iDMA) feature. In terms of performance concerns, complex IP devices normally include an embedded DMA engine, where the driver can be written such that this engine is used. Further, the iDMA feature allows this engine to be useable in the IA environment and the software driver can remain unmodified. In addition, system 10 can also offer an intelligent peer-to-peer (iP2P) capability. This allows devices to have direct access to the devices at the other side (e.g., IA devices can readily access the Non-IA devices, and vice-versa). Additionally, such a feature allows for an intelligent operation without intervention from a CPU and, thus, achieves ultra-low power consumption and high performance.

System 10 can also provide for an intelligent memory/IO mapping (iMEM) and an intelligent interrupt delivery (TINT). In typical arrangements, the Non-IA system has its own memory/IO/interruption scheme conventions that are different from the IA system. For the iMEM and iINT features, two options can be supported by the architecture of the present disclosure. The first option (IA Priority) allows the system to map the Non-IA convention to the IA convention if the two environments use compatible IP devices. As used herein in this Specification, the broad term 'IP device' is meant to encompass any type of firmware, software, hardware, drivers, cores, fabrics, tools, etc. that can be part of any of the processing systems discussed herein.

Consider one example involving an ARM SoC that is illustrative of the capabilities of the present disclosure. In the ARM SoC solution, the UART interrupt vector could be 0x14, which could then be remapped to 0x0b for COM2 port in the IA environment. The memory/IO address is also remapped and, thus, the IA driver can be used for the device, which is actually from the Non-IA environment (where the IP devices specifications are compatible). The second option (Non-IA Priority) can still use the Non-IA convention. The architecture can leave a hole in the IA space so that the corresponding memory/IO/interrupt space is not occupied. This is feasible in a contemporary IA system since the Peripheral Component Interconnect Express (PCIe) allows these spaces to be assigned arbitrarily by the operating system (OS). In this option, the Non-IA driver (if written in high-level language) can be reused without modification. Note all of the design features above help improve the reusability, performance, and even power consumption. In more general terms, the architecture can offer a more integrated and interactive heterogeneous system.

Turning to FIG. 2, FIG. 2 is a simplified block diagram illustrating an iFA architecture 40 associated with one embodiment of the present disclosure. This particular embodiment includes an IAF interface 42, an enumeration and configuration agent (ECA) 46, an address translation agent (ATA) 48, an interrupt translation agent (ITA) 50, and a NIF interface 44. As a general proposition, the iFA can be viewed as a core component, where the other four components can rely on the functionality provided by the iFA. Note that the left side and right side of the iFA are the interfaces that communicate with the IA Fabric and Non-IA Fabric. ECA 46 supports the enumeration command from the IA system (particularly from the PCI Express bus), and subsequently returns information to the operating system about the installed NIDs. It can also accept the configuration command and set any suitable parameters (e.g., associated with computational tasks, processing, assignments/responsibilities for workload, etc.) for ATA 48 and ITA 50.

One piece of important information (that is returned) relates to the large memory/IO address spaces that are needed for a certain task, along with the number of interrupt signals being generated, and the preferred address spaces/interrupt vectors. This information can be generated at the design time by the IP and fabric integration tools and, further, can be gathered manually if the tools are missing.

Note for the IA Priority case, the preferences are compatible to the IA system. For the Non-IA Priority case, the preferences can be the ones compatible with the original Non-IA system.

ATA 48 supports bidirectional translation after configuration. The memory request from the IAF can be remapped to a different address at the NIF side and, thus, does not disturb the Non-IA hardware design. The 10 request from the IAF can also be translated to a different memory request at the NIF side if the NIF does not support the 10 transaction. By contrast, requests from the NIF can also be translated to a different request at the IAF side. In this way, both forward and backward transactions (e.g., as required by iDMA/iMEM/iP2P) could be fully supported.

ITA 50 is configured to translate the interrupt requests originating from the NIF side to the IA interrupt messages or interrupt signals. In the IA Priority case, the new interrupt vector can be the same as if the interrupt is issued from an IAD, which has the exact same function as the NID. In the Non-IA Priority case, the interrupt vector can be the same as the vector at the NIF side.

Note that there can be two options regarding the logical view of the various NIDs. The first is a super device model, where the NIDs are viewed as a single logical super device. The ECA can return the super set of the requirement from each individual NID, and the NIDs can be configured as a whole. The software driver can be reused after the address and interrupt are properly configured. However, each of the different combinations of NIDs (which corresponds to a particular SoC model) uses a different super device identity (e.g., pci_id), so that the proper NID drivers could be loaded in the OS. This adds a small burden to the ID management. In one sense, this scenario is worse than that of a traditional IA environment, but it would not necessarily be worse than the Non-IA environment (e.g., the ARM ecosystem already has this wide variety and, further, the software code already exhibits many branches in selecting the proper driver code). The second option is a transparent device model. In this case, the iFA exposes each of the NIDs individually to the OS, and the OS can load each of the individual NID drivers. The software driver would have maximum flexibility, but this adds a burden to the hardware (e.g., because it would need more read only memory (ROM) to record elements behind the iFA). In certain cases, the iFA can combine particular information to ensure minimal ROM involvement.

Turning to FIG. 3, FIG. 3 is a simplified block diagram illustrating an example address mapping 60 associated with the present disclosure. In general, FIG. 3 is illustrating the address mapping between IA address space and Non-IA address space. This particular configuration being depicted includes an IA address space 62, which includes (but is not limited to) an Advanced Programmable Interrupt Controller (APIC) (that normally occupies the end of the x86 memory space), a system random access memory (RAM) 64, and several IA devices generally indicated at 75. Additionally, this particular configuration includes a Non-IA address space 66, which may include several Non-IA devices 70, 72, 74. In this particular arrangement, the IA physical address (IAPA) is represented as IAPA1, IAPA2, and IAPA3, which have logical connections to corresponding Non-IA devices 70, 72, 74. A Non-IA physical address (NIPA) corresponds to each of the Non-IA devices 70, 72, 74. IAPA is used over the IA fabric, and NIPA is used over the Non-IA fabric. In operation, if it is assumed that Non-IA device 1 uses NIPA1, it is mapped to the IA address space IAPA1. Similarly, NID2 can use NIPA2, and it is mapped to IAPA2; NID3 can use NIPA3, and it is mapped to IAPA3. The ATA can perform the appropriate translation from IAPA to NIPA.

Figure 4:
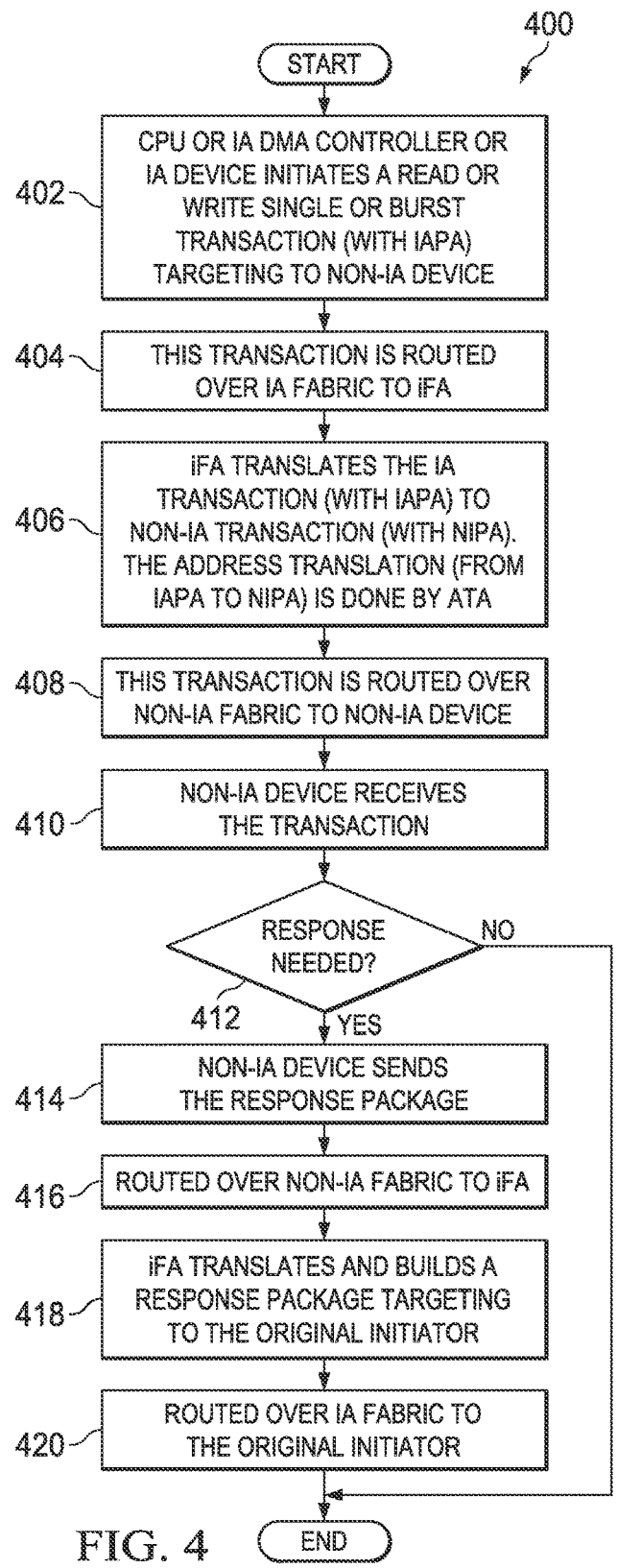
FIG. 4 is a simplified flowchart illustrating one possible set of activities for an initiated transaction associated with the present disclosure.

FIG. 4 is a simplified flowchart 400 illustrating an example IA initiated transaction in accordance with one embodiment of the present disclosure. This particular flow may begin at 402, where a CPU or an IA DMA controller (or an IA device) initiates a read or write single or burst transaction (with the IAPA) targeting the Non-IA device. At 404, this transaction is routed over an IA fabric to the iFA. At 406, iFA translates the IA transaction (with IAPA) to the Non-IA transaction (with NIPA). The address translation (from IAPA to NIPA) can be performed by the ATA. At 408, the transaction can be routed over the Non-IA fabric to the Non-IA device. At 410, the Non-IA device receives the transaction and a determination is made as to whether a response would be necessary (shown generally at 412). If no response is necessary, then the flow may suitably end. If a response is appropriate, then at 414, the Non-IA device can send the response package. This can be routed over the Non-IA fabric to the iFA at 416. At 418, the iFA can translate and build a response package targeting the original initiator. At 420, the response can be routed over the IA fabric to the original initiator.

Figure 5:
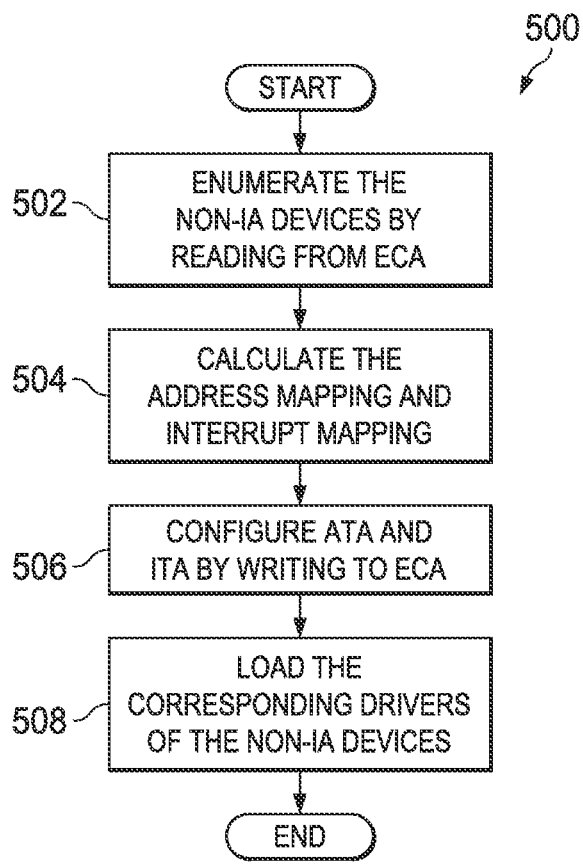
FIG. 5 is another simplified flowchart illustrating one possible set of activities for a system initialization sequence associated with the present disclosure.

FIG. 5 is a simplified flowchart 500 illustrating example activities associated with a system initialization sequence for the present disclosure. This particular flow may begin at 502, where the Non-IA devices are enumerated by retrieving data from the ECA. At 504, the address mapping and interrupt mapping is calculated. At 506, the ATA and the ITA is configured by writing to the ECA. At 508, the corresponding drivers of the Non-IA devices are loaded.

Figure 6:
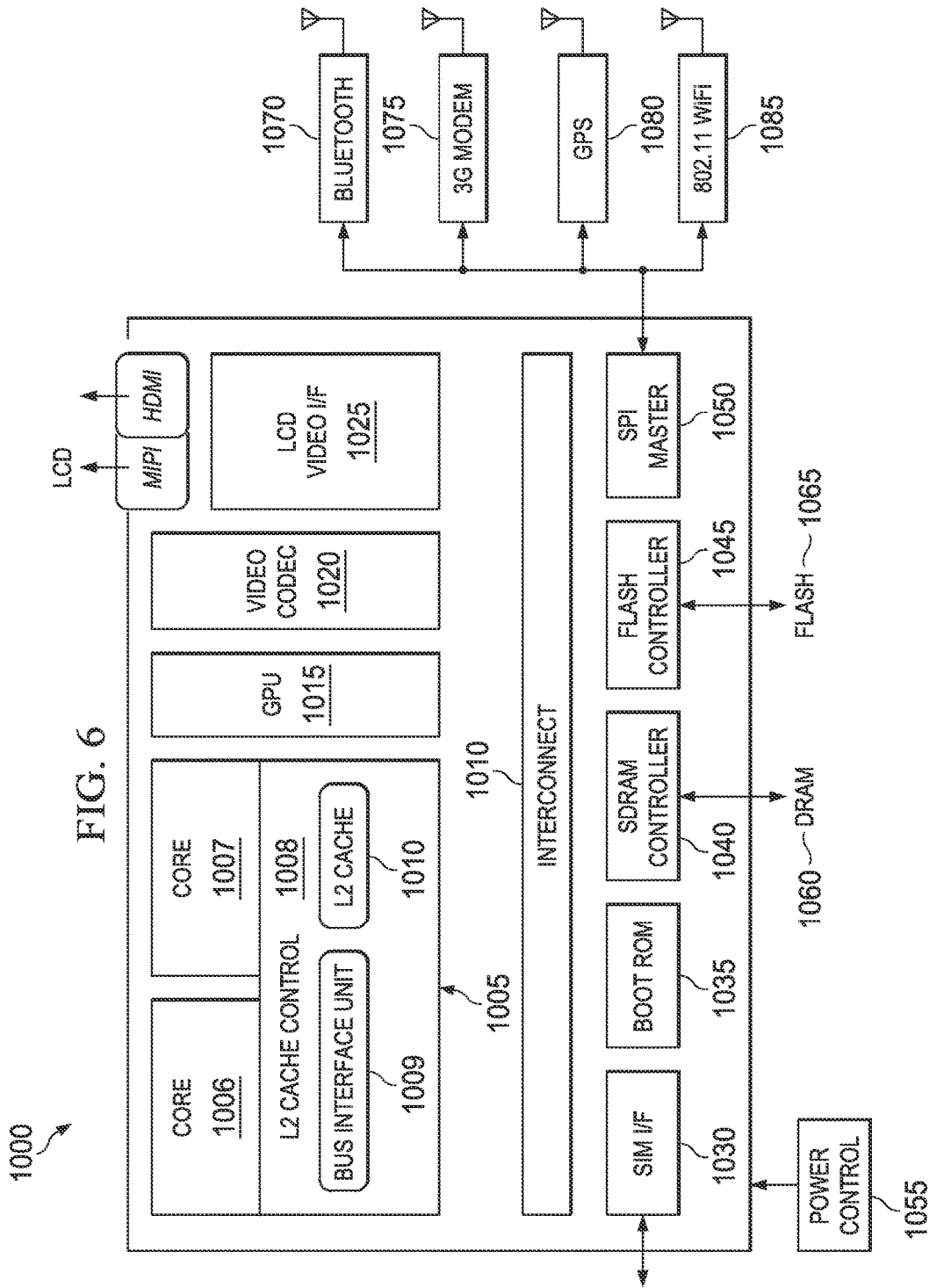
FIG. 6 is a simplified block diagram associated with an example ARM ecosystem SOC of the present disclosure.

FIG. 6 is a simplified block diagram associated with an example ARM ecosystem SOC 1000 of the present disclosure. One potential implementation of the present disclosure includes an integration of an IA and an ARM component. For example, the particular implementation of FIG. 6 can be associated with any ARM core (e.g., A-9, A-15, etc.). Further, the architecture can be part of any type of tablet, smartphone (inclusive of Android phones, i-Phones), i-Pad, personal computer, server, video processing components, laptop computer (inclusive of any type of notebook), any type of touch-enabled input device, etc.

In this example of FIG. 6, ARM ecosystem SOC 1000 may include multiple cores 1006-1007, an L2 cache control 1008, a bus interface unit 1009, an L2 cache 1010, a graphics processing unit (GPU) 1015, an interconnect 1010, a video codec 1020, and a liquid crystal display (LCD) I/F 1025, which may be associated with mobile industry processor interface (MIPI)/high-definition multimedia interface (HDMI) links that couple to an LDC.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, this particular example may include a number of communication capabilities, interfaces, and features such as instances of Bluetooth 1070, a 3G modem 1075, a global positioning system (GPS) 1080, and an 802.11 WiFi 1085.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash®

Player, Java Platform Standard Edition (Java SE), JavaFX, Linux, Microsoft Windows Embedded, Symbian and Ubuntu, etc.). In one particular example, the core processor may implement an out-of-order superscalar pipeline with a coupled low-latency level-2 cache.

Note that in certain example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that includes digital logic, software, code, electronic instructions, or any suitable combination thereof.

Note that with the examples provided above, as well as numerous other examples provided herein, interaction may be described in terms of paired Non-IA and IA devices, address spaces, ecosystems, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the steps in the flows illustrate only some of the possible signaling scenarios and patterns that may be executed by, or within, the circuits discussed herein. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the specifications, dimensions, and relationships outlined herein (e.g., specific command values, memory allocations, supporting ancillary components etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation may include a system for performing one or more tests for an electronic device, the system including means for receiving a message associated with a transaction involving a first system. A fabric adapter couples to a first fabric associated with the first system and to a second fabric associated with a second system for which the message is intended. The system may also include means for mapping a first physical address in a first address space of the first system to a second physical address in a second address space of the second system, and means for receiving a response to the message from the second system. In more particular embodiments, the system may include means for receiving an enumeration command from a Peripheral Component Interconnect Express (PCIe) bus. Other example implementations may include means for returning information to an operating system relating to one or more installed devices associated with the second system. Yet other example embodiments may include means for translating an interruption request originating from the second system to a format recognized by the first system. Note that the 'means for' discussed above could be provided by any suitable software, logic, code, non-transitory media, circuitry, processors, integrated circuits, computer instructions, computing devices, etc.

What is claimed is:

1. An electronic fabric for a processing system, comprising:
   a fabric adapter to couple to a first fabric associated with a first system and to couple to a second fabric associated with a second system, wherein the fabric adapter is configured to pass bidirectional communications between the first system and the second system;
   an address translation agent configured to map a first physical address in a first address space of the first system to a second physical address in a second address space of the second system, wherein the address translation agent is configured to support bidirectional translations for one or more addresses associated with the first system and the second system;

a configuration agent configured to communicate with a first interface associated with the first fabric and to communicate with a second interface associated with the second fabric, wherein the configuration agent is configured to return information to an operating system relating to one or more installed devices associated with the second system; and an interrupt translation agent configured to translate an interruption request originating from the second system to a format recognized by the first system, wherein the configuration agent is further configured to accept a configuration command and set one or more parameters for the address translation agent and the interrupt translation agent.

2. The electronic fabric of claim 1, wherein the configuration agent is configured to support enumeration commands from a Peripheral Component Interconnect Express (PCIe) bus.

3. The electronic fabric of claim 1, wherein one or more devices associated with the second system are enumerated by interacting with the configuration agent.

4. The electronic fabric of claim 3, wherein corresponding drivers of the one or more devices associated with the second system are loaded after the address translation agent is configured.

5. The electronic fabric of claim 1, wherein the address translation agent is configured by writing to the configuration agent.

6. A method for interfacing between systems, comprising:
receiving a configuration command;
setting one or more parameters for address translation;
receiving a message associated with a transaction involving a first system, wherein a fabric adapter couples to a first fabric associated with the first system and to a second fabric associated with a second system for which the message is intended;
mapping a first physical address in a first address space of the first system to a second physical address in a second address space of the second system, wherein the mapping is performed based on the one or more parameters;
receiving a response to the message from the second system;
returning information to an operating system relating to one or more installed devices associated with the second system;
translating an interruption request originating from the second system to a format recognized by the first system; and
performing bidirectional translations for one or more addresses associated with the first system and the second system.

7. The method of claim 6, further comprising:
receiving an enumeration command from a Peripheral Component Interconnect Express (PCIe) bus.

8. The method of claim 6, wherein corresponding drivers of devices of the second system are loaded after the address translation agent is configured.

9. The method of claim 8, wherein the devices associated with the second system are enumerated by interacting with a configuration agent.

10. The method of claim 9, wherein the address translation agent is configured by writing to the configuration agent.

11. The method of claim 6, wherein an address translation agent that performed the mapping is configured to support bidirectional translations for one or more addresses associated with the first system and the second system.

12. A system for interfacing between systems, comprising:
means for receiving a configuration command;
means for setting one or more parameters for address translation;
means for receiving a message associated with a transaction involving a first system, wherein a fabric adapter couples to a first fabric associated with the first system and to a second fabric associated with a second system for which the message is intended;
means for mapping a first physical address in a first address space of the first system to a second physical address in a second address space of the second system;
means for receiving a response to the message from the second system;
means for returning information to an operating system relating to one or more installed devices associated with the second system;
means for translating an interruption request originating from the second system to a format recognized by the first system; and
means for performing bidirectional translations for one or more addresses associated with the first system and the second system.

13. The system of claim 12, further comprising:
means for receiving an enumeration command from a Peripheral Component Interconnect Express (PCIe) bus.

* * * * *